United States Patent
Feucht et al.

[11] Patent Number: 6,164,269
[45] Date of Patent: Dec. 26, 2000

[54] EXHAUST GAS RECIRCULATION VALVE ASSEMBLY HAVING AN INTEGRATED CHECK VALVE

[75] Inventors: Dennis D. Feucht, Morton; Mylvaganam Arulraja, Peoria, both of Ill.

[73] Assignee: Caterpillar Inc., Peoria, Ill.

[21] Appl. No.: 08/962,502

[22] Filed: Oct. 31, 1997

[51] Int. Cl.[7] .......................... F02M 25/07; F16K 15/18
[52] U.S. Cl. .............................. 123/568.11; 137/614.17; 137/614.2
[58] Field of Search ................ 60/605.2; 123/568.11, 123/568.12; 137/614.17, 614.2, 493.1

[56] References Cited

U.S. PATENT DOCUMENTS

| | | | |
|---|---|---|---|
| 3,363,729 | 1/1968 | Rumsey | 188/315 |
| 3,470,904 | 10/1969 | Hune et al. | 137/614.17 |
| 3,527,242 | 9/1970 | Ansite | 137/102 |
| 3,682,151 | 8/1972 | Tatsutomi | 123/217 |
| 4,250,711 | 2/1981 | Zehnder | 60/605.2 |
| 4,300,515 | 11/1981 | Straubel et al. | 123/568.18 |
| 4,313,415 | 2/1982 | Shinzawa | 123/568.15 |
| 4,324,097 | 4/1982 | Schmitt et al. | 60/293 |
| 4,329,965 | 5/1982 | Ueda et al. | 123/568.18 |
| 4,350,013 | 9/1982 | Yoshiba | 60/605.2 |
| 4,420,012 | 12/1983 | O'Neill | 222/102 |
| 4,424,790 | 1/1984 | Curtil | 123/559.1 |
| 4,495,929 | 1/1985 | Maeda et al. | 123/568.28 |
| 4,846,221 | 7/1989 | Kanemaru | 137/614.17 |
| 4,986,310 | 1/1991 | Bailey et al. | 137/859 |
| 5,137,003 | 8/1992 | Kyoya et al. | 123/564 |
| 5,345,967 | 9/1994 | Naffziger | 137/614.2 |
| 5,531,205 | 7/1996 | Cook et al. | 123/568.24 |
| 5,611,202 | 3/1997 | Sumser et al. | 60/605.2 |
| 5,657,790 | 8/1997 | Mohn | 137/614.2 |
| 5,682,746 | 11/1997 | Von Hoerner | 60/605.2 |

FOREIGN PATENT DOCUMENTS

| | | |
|---|---|---|
| 2742206 | 6/1997 | France . |
| 1147856 | 4/1963 | Germany . |
| 2423289 | 11/1975 | Germany . |
| 1-177446 | 7/1989 | Japan . |
| 822148 | 10/1959 | United Kingdom . |
| WO 96/32583 | 10/1996 | WIPO . |

OTHER PUBLICATIONS

Patent Abstracts of Japan vol. 13 No. 455 (M–879), Oct. 13, 1989 and JP 01 177446A (Mitsubishi).
Copy of International Search Report dated Feb. 16, 1999 relating to International Application No. PCT/US98/22177.

*Primary Examiner*—Willis R. Wolfe
*Attorney, Agent, or Firm*—Maginot, Addison & Moore

[57] ABSTRACT

An EGR valve assembly for an internal combustion engine includes a check valve which allows the use of EGR under conditions where the average pressure of exhaust gases in the exhaust manifold is less than the average pressure of air in the intake manifold. The check valve allows pressure pulses in the exhaust manifold to advance exhaust gases from the exhaust manifold to the intake manifold while preventing the back flow of air from the intake manifold to the exhaust manifold. The EGR valve assembly further includes a housing defining a chamber. The housing further defines a housing outlet and a housing inlet both which are fluid communication with the chamber. The valve assembly further includes a master valve positioned within the chamber. The master valve is positionable between a first master position and a second master position. The check valve is (1) movable between a first check position and a second check position when the master valve is positioned in the second master position, and (2) maintained in the first check position when the master valve is positioned in the first master position. A method of controlling a flow of engine exhaust in an internal combustion engine is also disclosed.

20 Claims, 7 Drawing Sheets

EXHAUST GAS RECIRCULATION VALVE ASSEMBLY HAVING AN INTEGRATED CHECK VALVE

TECHNICAL FIELD OF THE INVENTION

The present invention relates generally to an exhaust gas recirculation (EGR) valve assembly for an internal combustion engine, and more specifically to an exhaust gas recirculation valve assembly having a check valve integrated therein.

BACKGROUND OF THE INVENTION

During operation of an internal combustion engine, it is desirable to control the formation and emission of certain gases, such as the oxides of nitrogen ($NO_x$). One method of achieving this result is the use of exhaust gas recirculation (EGR) which is a process whereby exhaust gases are selectively routed from the exhaust manifold or manifolds to the intake manifold of the internal combustion engine. The use of EGR reduces the amount of $NO_x$ produced during operation of the internal combustion engine. In particular, NOx is produced when nitrogen and oxygen are combined at high temperatures associated with combustion. The presence of chemically inert gases, such as those gases found in the exhaust of the engine, inhibits nitrogen atoms from bonding with oxygen atoms thereby reducing $NO_x$ production.

A drawback with using EGR on a turbocharged diesel engine is that EGR cannot be used under conditions where the average pressure of air in the intake manifold is greater than the average pressure of exhaust gases in the exhaust manifold. Using EGR under these conditions would result in a net flow of air from the intake manifold to the exhaust manifold, rather than a net flow of exhaust gases from the exhaust manifold to the intake manifold.

One solution to this problem is to increase the average pressure of exhaust gases in the exhaust manifold. Increasing the average pressure in the exhaust manifold is easily achieved by reducing the size of the turbocharger housing or by routing the exhaust gases through an orifice prior to entering the turbocharger housing. However, increasing the average pressure in the exhaust manifold has a drawback in that the engine must expend more energy to advance the exhaust gases from each cylinder to the exhaust manifold.

For applications involving earthmoving equipment and large trucks, the turbocharged diesel engine is configured for rapid response, e.g. the engine must respond rapidly to changing load conditions. To achieve rapid response, small volume exhaust manifolds are connected to specific exhaust ports in order to preserve the pressure of each pulse of exhaust gases that is created when an exhaust valve is opened. The pulses of exhaust gases are directed to the turbocharger's turbine disk which accelerates the turbine disk at a higher rate than is possible when using a large volume exhaust manifold. The turbine disk drives a shaft which accelerates the turbocharger's compressor at the same rate as the turbine disk. The higher compressor acceleration rate enables the turbocharger to compress a greater amount of intake air. The greater amount of air introduced into the cylinders allows more fuel to be burned which increases the engine's power output. The increased power output allows the engine to respond more rapidly to changing load conditions. Furthermore, as turbocharger efficiencies improve, the turbocharger compresses more air into the intake manifold, the average pressure of the air in the intake manifold can become greater than the average pressure of exhaust gases in the exhaust manifold thereby preventing the use of EGR systems which have heretofore been designed. However, the instantaneous pressure of each pulse of exhaust gases in the exhaust manifold during certain operating conditions is greater than the instantaneous pressure of the compressed air in the intake manifold.

In order to utilize the pressure pulses of exhaust gases for EGR purposes, an EGR valve should preferably be configured to open when each of the high pressure pulses is present in the exhaust manifold, and to close when the instantaneous pressure in the intake manifold is greater than the instantaneous pressure in the exhaust manifold (i.e. between pulses of exhaust gases). Thus, the EGR valve could advance exhaust gases from the exhaust manifold to the intake manifold when the average pressure of exhaust gases in the exhaust manifold is less than the pressure of air in the intake manifold without increasing the average pressure of exhaust gases in the exhaust manifold.

What is needed therefore is an apparatus and method for advancing EGR gases which overcome one or more of the above-mentioned drawbacks.

DISCLOSURE OF THE INVENTION

In accordance with a first embodiment of the resent invention, there is provided a valve assembly. The valve assembly includes a housing defining a chamber. The housing further defines a housing outlet and a housing inlet both being in fluid communication with the chamber. The valve assembly further includes a master valve positioned within the chamber. The master valve is positionable between a first master position and a second master position. The valve assembly still further includes a check valve which is (1) movable between a first check position and a second check position when the master valve is positioned in the second master position, and (2) maintained in the first check position when the master valve is positioned in the first master position.

In accordance with a second embodiment of the present invention, there is provided an engine assembly. The engine assembly includes an internal combustion engine having an engine air inlet and an engine exhaust outlet. The engine assembly further includes a master valve assembly which includes a valve housing having a housing inlet and a housing outlet. The engine assembly still further includes a first conduit which connects the engine exhaust outlet in fluid communication with the housing inlet and a second conduit which connects the engine air inlet in fluid communication with the housing outlet. The master valve assembly (1) places the first conduit in fluid communication with the second conduit in a first mode of operation, and (2) isolates the first conduit from the second conduit in a second mode of operation. The engine assembly yet further includes a check valve assembly which prevents fluid flow between the engine air inlet and the engine exhaust outlet via the first conduit and the second conduit when (1) pressure in the engine air inlet is greater than pressure in the engine exhaust outlet, and (2) the master valve assembly is in the first mode of operation.

In accordance with a third embodiment of the present invention, there is provided a method of controlling a flow of engine exhaust in an engine assembly. The engine assembly includes (1) an internal combustion engine having an engine air inlet and an engine exhaust outlet, (2) a master valve assembly which includes a valve housing having a housing inlet and a housing outlet, (3) a first conduit which connects the engine exhaust outlet in fluid communication with the housing inlet, and (4) a second conduit which connects the engine air inlet in fluid communication with the housing outlet. The method includes the step of operating the master valve assembly in a first mode of operation so as to place the first conduit in fluid communication with the second conduit. The method further includes the step of operating the master valve assembly in a second mode of operation so as to isolate the first conduit from fluid communication with the second conduit. The method still further includes the step of preventing fluid flow between the engine air inlet and the engine exhaust outlet via the first conduit and the second conduit when (1) pressure in the engine air inlet is greater than pressure in the engine exhaust outlet, and (2) the master valve assembly is in the first mode of

BEST MODE FOR CARRYING OUT THE INVENTION

While the invention is susceptible to various modifications and alternative forms, two specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Figure 1:
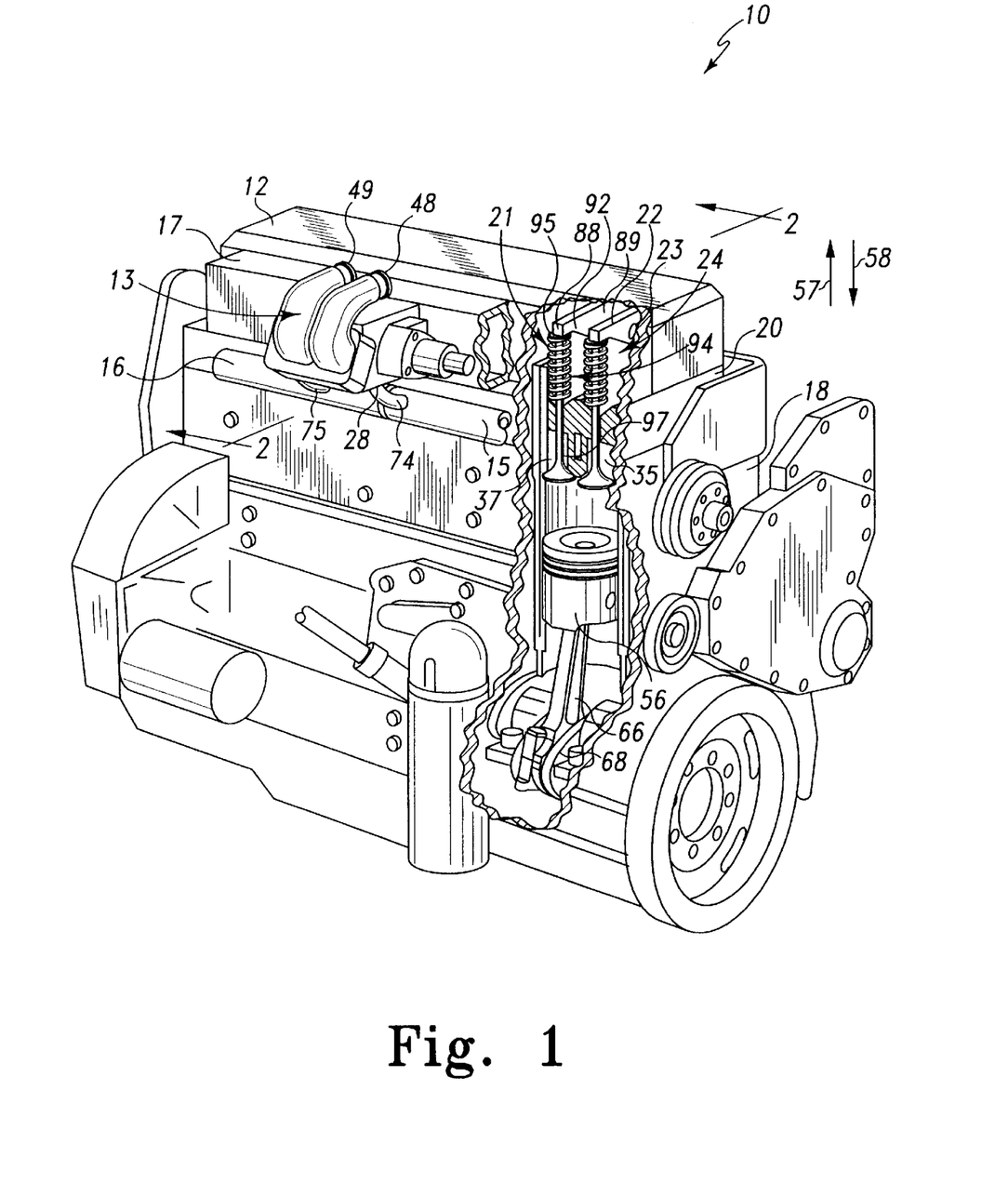
FIG. 1 is a perspective view of an internal combustion engine 10 which incorporates the features of the present invention therein (note that a portion of the engine 10 is cut away for clarity of description)
Figure 2:
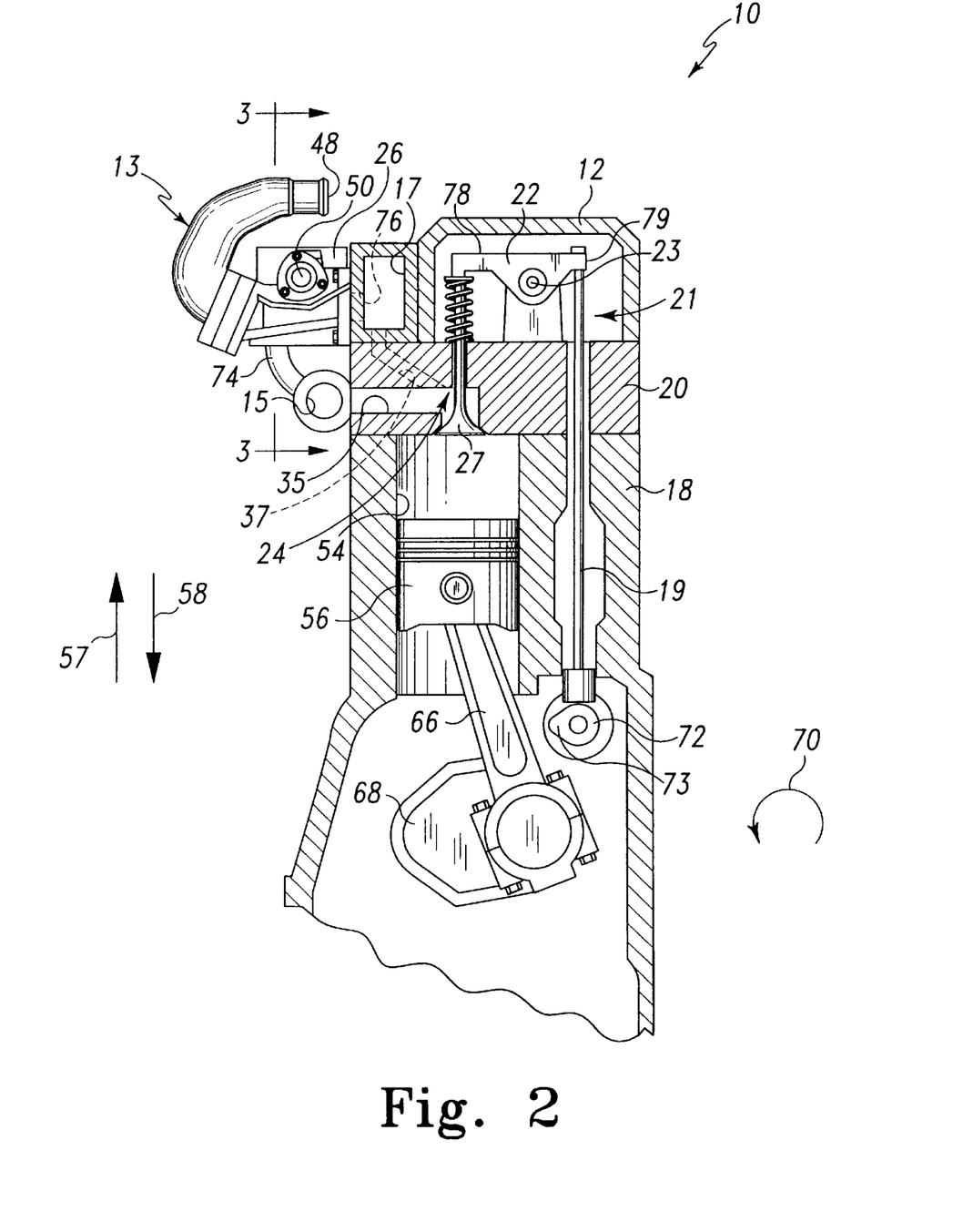
FIG. 2 is a partial cross sectional view of the internal combustion engine 10 taken along line 2—2 of FIG. 1, as viewed in the direction of the arrows.

Referring now to FIGS. 1–2, there is shown an internal combustion engine 10 such as a six-cylinder turbocharged diesel engine. The internal combustion engine 10 includes a valve cover 12, an EGR assembly 13, an engine block 18, and an engine head 20.

As shown in FIG. 2, the engine block 18 has a cylinder 54 defined therein. In a known manner, a piston 56 is operatively located within the cylinder 54. In particular, during an upward stroke, the piston 56 translates in the general direction of arrow 57. During a downward stroke, the piston 56 translates in the general direction of arrow 58.

The piston 56 is coupled to a first end of a connecting rod 66, whereas a second end of the connecting rod 66 is connected to a crankshaft 68. During the upward stroke of the piston 56, the connecting rod 66 is likewise translated in the general direction of arrow 57. During the downward stroke of the piston 56, the connecting rod 66 is likewise translated in the general direction of arrow 58. In both cases, the crankshaft 68 rotates in the direction of arrow 70 of FIG. 2.

The engine head 20 includes a number of head air inlet ports 37 and head exhaust outlet ports 35. An engine air inlet or intake manifold 17 places the head air inlet ports 37 in fluid communication with a pair of air intake lines 48,49 associated with the internal combustion engine 10. A pair of engine exhaust outlets or exhaust manifolds 15, 16 places the head exhaust outlet ports 35 in fluid communication with a turbocharger and a tailpipe (not shown) associated with the internal combustion engine 10. It should be appreciated that the exhaust manifold 15 is in fluid communication with the head exhaust ports 35 of each of the front three cylinders of the internal combustion engine 10, whereas the exhaust manifold 16 is in fluid communication with the head exhaust ports 35 of the rear three cylinders.

An upper portion of the engine head 20 includes a valve and rocker arm area 21. Within the valve and rocker arm area 21 is an exhaust valve assembly 24, an intake valve assembly 94, an exhaust rocker arm 22, and an intake rocker arm 92. It should be appreciated that when the valve cover 12 is sealably secured to the engine head 20 an engine lubricant, such as oil, is contained therein so as to lubricate a number of components associated with the internal combustion engine 10.

When the exhaust valve assembly 24 is placed in a closed position, as shown in FIG. 2, the cylinder 54 is isolated from the head exhaust outlet ports 35 and hence the exhaust manifolds 15, 16. When the exhaust valve assembly 24 is placed in an open position, the cylinder 54 is in fluid communication with the exhaust manifolds 15, 16 through the head exhaust outlet ports 35. The exhaust valve assembly 24 includes an exhaust valve member 27 and an exhaust spring 25 concentrically mounted about the exhaust valve member 27. The exhaust spring 25 applies a force or bias to the exhaust valve member 27 that biases the exhaust valve assembly 24 into the closed position, as shown in FIG. 2. Hence, the exhaust valve assembly 24 is held in the closed position until urged by the exhaust rocker arm 22 into the open position.

The exhaust rocker arm 22 is movably secured to the engine head 20. In particular, the exhaust rocker arm 22 is free to pivot about a rocker shaft 23 which is non-movably secured to the engine head 20. A first end 78 of the exhaust rocker arm 22 is operatively coupled to the exhaust valve member 27, whereas a second end 79 of the exhaust rocker arm 22 is operatively coupled to a first end of an exhaust pushrod 19 (see FIG. 2). A second end of the exhaust pushrod 19 is operatively coupled to a camshaft 72.

The camshaft 72 includes a first cam lobe 73 which is moved into and out of contact with the second end of the exhaust pushrod 19 during rotation of the camshaft 72. When the cam lobe 73 is rotated into contact with the second end of the exhaust pushrod 19, the exhaust pushrod 19 is urged in the general direction of arrow 57 of FIG. 2. As the exhaust pushrod 19 is urged in the general direction of arrow 57, the exhaust rocker arm 22 pivots about the rocker shaft 23 thereby causing the first end 78 of the exhaust rocker arm 22 to be urged in the general direction of arrow 58 thereby likewise urging the exhaust valve member 27 in the general direction of arrow 58. When the force exerted on the exhaust valve member 27 by the first end 78 of the exhaust rocker arm 22 is greater in magnitude than the spring bias generated by the exhaust spring 25, the exhaust valve member 27 is moved in the general direction of arrow 58 thereby positioning the exhaust valve assembly 24 in the open position. When the camshaft 72 is rotated beyond the maximum height of the cam lobe 73, the spring bias of the exhaust spring 25 urges the exhaust valve member 27 in the general direction of arrow 57 thereby returning the valve assembly 24 to the closed position. It should be appreciated that as the exhaust valve member 27 is urged in the general direction of arrow 57 by the exhaust spring 25, the first end 78 of the exhaust rocker arm 22 is likewise urged in the general direction of arrow 57 which causes the exhaust rocker arm 22 to pivot about the rocker shaft 23 thereby causing the second end 79 of the exhaust rocker arm 22 to be urged in the general direction of arrow 58.

It should therefore be appreciated that as the exhaust valve assembly 24 is placed in the open position, exhaust gases within the cylinder 54 are allowed to advance from the cylinder 54, through the head exhaust outlet ports 35, and into the exhaust manifolds 15, 16. It should be further appreciated that as the exhaust valve assembly 24 is placed in the closed position, the cylinder 54 is isolated from the exhaust manifolds 15, 16 thereby inhibiting advancement of the exhaust gases out of the cylinder 54.

Similarly, when the intake valve assembly 94 is placed in a closed position, as shown in FIG. 1, the cylinder 54 is isolated from the head air inlet ports 37 and hence the intake manifold 17. When the intake valve assembly 94 is placed in an open position, the cylinder 54 is in fluid communication with the intake manifold 17 through the head air inlet ports 37. As shown in FIG. 1, the intake valve assembly 94 includes an intake valve member 97 and an intake spring 95 concentrically mounted about the intake valve member 97. The intake spring 95 applies a force or bias to the intake valve member 97 that biases the intake valve assembly 94 into the closed position. Hence, the intake valve assembly 94 is held in the closed position until urged by the intake rocker arm 92 into the open position.

The intake rocker arm 92 is movably secured to the engine head 20. In particular, the intake rocker arm 92 is free to pivot about the rocker shaft 23. A first end 88 of the intake rocker arm 92 is operatively coupled to the intake valve member 97, whereas a second end 89 of the intake rocker arm 92 is operatively coupled to a first end of an intake pushrod (not shown). The second end of the intake pushrod is operatively coupled to the camshaft 72.

The camshaft 72 includes a second cam lobe (not shown) which is moved into and out of contact with the second end of the intake pushrod during rotation of the camshaft 72. When the cam lobe is rotated into contact with the intake pushrod, the intake pushrod is urged in the general direction of arrow 57 of FIG. 1. As the intake pushrod is urged in the general direction of arrow 57, the intake rocker arm 92 pivots about the rocker shaft 23 thereby causing the first end 88 of the intake rocker arm 92 to be urged in the general direction of arrow 58 of FIG. 1 thereby likewise urging the intake valve member 97 in the general direction of the arrow 58. When the force exerted on the intake valve member 97 by the first end 88 of the intake rocker arm 92 is greater in magnitude than the spring bias generated by the intake spring 95, the intake valve member 97 is moved in the general direction of arrow 58 thereby positioning the intake valve assembly 94 in the open position. When the camshaft 72 is rotated beyond the maximum height of the cam lobe that is acting upon the intake pushrod, the spring bias of the intake spring 95 urges the intake valve member 97 in the general direction of arrow 57 thereby returning the intake valve assembly 94 to the closed position. It should be appreciated that as the intake valve member 97 is urged in the general direction of arrow 57 by the intake spring 95, the first end 88 of the intake rocker arm 92 is likewise urged in the general direction of arrow 57 which causes the intake rocker arm 92 to pivot about the rocker shaft 23 thereby causing the second end 89 of the intake rocker arm 92 to be urged in the general direction of arrow 58.

It should therefore be appreciated that as the intake valve assembly 94 is placed in the open position, air (along with any exhaust gases which have been routed to the intake manifold 17 by the EGR assembly 13) within the intake manifold 17 is advanced through the head air inlet ports 37, and into the cylinder 54. It should be further appreciated that as the intake valve assembly 94 is placed in the closed position, the cylinder 54 is isolated from intake manifold 17 thereby inhibiting advancement of air from the intake manifold 17 into the cylinder 54.

The internal combustion engine 10 is a four stroke engine. The first stroke is an intake stroke, during which the exhaust valve assembly 24 is positioned in the closed position and the intake valve Furthermore, during the intake stroke, the piston 56 is advanced in the general direction of arrow 58 thereby creating a partial vacuum in the cylinder 54. This partial vacuum causes air to be advanced from the intake manifold 17, through the head air inlet ports 37, and into the cylinder 54. Advancing to a compression stroke, the intake valve assembly 94 and the exhaust valve assembly 24 are both positioned in their respective closed positions. As the piston 56 moves upward in the general direction of arrow 57, it compresses the air in the cylinder 54. As the piston 56 continues to advance toward a top of its stroke, a fuel, such as diesel fuel, is introduced into the cylinder 54 thereby creating a fuel and air mixture with the air present in the cylinder 54. Near the top of the stroke of the piston 56, the fuel and air mixture is ignited by the heat generated as a result of compressing the fuel and air mixture. Ignition of the fuel and air mixture advances the internal combustion engine 10 to a power stroke in which the intake valve assembly 94 and the exhaust valve assembly 24 are both positioned in their respective closed positions. The fuel and air mixture is combusted and exhaust gases are formed. The formation of the exhaust gases generates pressure. This pressure acts upon the piston 56 to create a force which drives the piston 56 in the general direction of arrow 58. Thereafter, the internal combustion engine 10 is advanced to an exhaust stroke during which the exhaust valve assembly 24 is positioned in the open position and the intake valve assembly 94 is positioned in the closed position. Since the pressure generated by the exhaust gases in the cylinder 54 is greater than the pressure in the exhaust manifolds 15, 16, the exhaust gases advance from the cylinder 54, through the head exhaust outlet ports 35, and into the exhaust manifolds 15, 16 thereby creating a pressure pulse in the exhaust manifold 15,16.

During certain operating conditions of the internal combustion engine 10, it is desirable to inhibit the formation of $NO_x$ by introducing chemically inert exhaust gases into the cylinder 54 during the intake stroke. Hence, the EGR assembly 13 routes exhaust gases from the exhaust manifolds 15, 16 to the intake manifold 17. In particular, the EGR assembly 13 includes a first valve assembly 60 which selectively places the exhaust manifold 15 in fluid communication with the intake manifold 17 and a second valve assembly (not shown) which selectively places the exhaust manifold 16 in fluid communication with the intake manifold 17 during such operating conditions. The second valve assembly is substantially identical to the first valve assembly 60.

Figure 3:
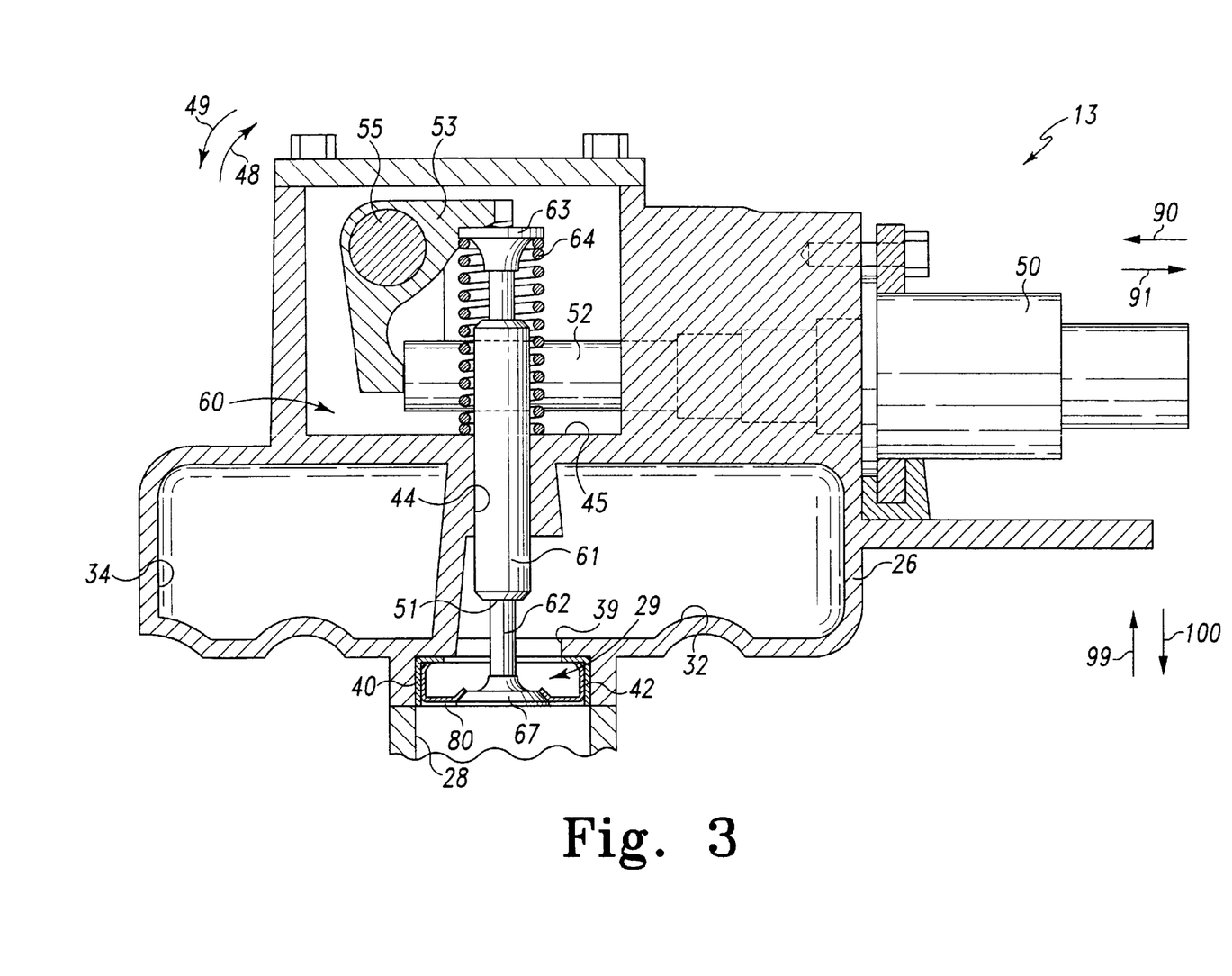
FIG. 3 is an enlarged cross sectional view of the housing of the EGR valve assembly 13 of the internal combustion engine 10 taken along line 3—3 of FIG. 2 as viewed in the direction of the arrows (note that FIG. 3 shows a first embodiment of the check valve of the EGR assembly)

Referring now to FIG. 3, the EGR assembly 13 includes a housing 26 having a chamber 29 defined therein. The housing 26 further defines a first valve housing inlet 28 and a first valve housing outlet 32. The first inlet 28 and the first outlet 32 are each in fluid communication with the chamber 29. The EGR assembly 13 selectively connects the front three cylinders to the intake manifold 17. Another EGR assembly, substantially similar to EGR assembly 13 connects the rear three cylinders to the intake manifold 17.

As shown in FIG. 1, the exhaust manifold 15 is in fluid communication with the first inlet 28 of the EGR valve assembly 13, whereas the exhaust manifold 16 is in fluid communication with a second valve housing inlet (not shown) defined in housing 26. In particular, the exhaust manifold 15 is coupled to the first inlet 28 via a conduit 74, whereas the exhaust manifold 16 is coupled to the second inlet via a conduit 75. The first outlet 32 and a second outlet 34 are in fluid communication with the intake manifold 17. More specifically, the first outlet 32 is coupled to the intake manifold 17 via a port 76 (see FIG. 2) and the second outlet 34 is coupled to the intake manifold via a second port (not shown).

A first valve assembly 60 selectively places the first inlet 28 in fluid communication with the first outlet 32 allowing exhaust gases to be advanced from the exhaust manifold 15 to the intake manifold 17. Whereas a second valve assembly (not shown) selectively places the second inlet in fluid communication with the second outlet 34 allowing exhaust gases to be advanced from the exhaust manifold 16 to the intake manifold 17.

It should be noted that the mechanical configuration of the first valve assembly 60 is substantially identical to the mechanical configuration of the second valve assembly. As a result, only the first valve assembly is being described in detail.

Referring now to FIG. 3, the housing 26 further has a valve opening 39 defined therein which places the first inlet 28 in fluid communication with the first outlet 32. As shown in FIG. 3, a portion of the valve opening 39 defines a check recess 40. Positioned within the check recess 40 is a check seal 42. The check seal 42 is pressed into the check recess 40 such that the check seal 42 is nonmovably secured to the check recess 40. The check seal 42 serves two purposes: (1) it prevents flow around the edge of the check recess 40 and (2) it eliminates wear on the housing 26 caused operation of the valve assembly 60.

The housing 26 further includes a valve opening 44. the valve assembly 60 includes a valve sleeve 61, a valve member 62, a spring retainer 63, a valve spring 64, and a check valve 80. The valve sleeve 61 is received through the valve opening 44 and is securely attached to the housing 26. The valve member 62 is received through a passage 51 defined in the valve sleeve 61. The valve member 62 is free to move in the general directions of arrows 99 and 100. The spring retainer 63 is secured to an upper end of the valve member 62. The valve spring 64 is interposed between the spring retainer 63 and a contact surface 45 of the housing 26. The spring 64 provides a bias that urges the spring retainer 63, and thus the valve member 62, in the general direction of arrow 99.

Figure 4A:
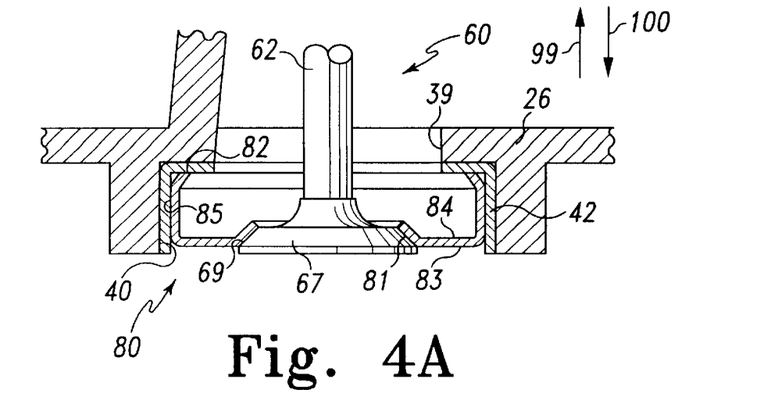
FIG. 4A is an enlarged cross sectional view of the EGR valve assembly 13 of FIG. 3 (note that the master valve is located in a first master position and the check valve is located in a first check position)

The lower end of the valve member 62 includes a master valve 67. The check valve 80 is positioned about the valve member 62 and above the master valve 67. As a result of the bias force of the spring 64, the valve member 62, and thus the master valve 67, are urged in the general direction of arrow 99 thus causing the master valve 67 to be seated on the check valve 80. In particular, a surface 69 of the master valve 67 is urged into contact with the seating surface 81 of the check valve 80. As the master valve 67 urges the check valve 80 in the general direction of arrow 99, a sealing surface 82 and a sealing surface 85 of the check valve 80 are each brought into contact with the check seal 42. It should be appreciated that as the spring bias of the spring 64 urges the master valve 67 upwardly to a first master position, the master valve 67 urges the check valve 80 upwardly to a first check position. It should further be appreciated that placing the master valve 67 in the first master position and placing the check valve 80 in the first check position isolates the first inlet 28 from the first outlet 32. FIGS. 3 and 4A show the master valve 67 positioned in the first master position and the check valve 80 positioned in the first check position.

The EGR assembly 13 further includes a solenoid 50, a piston 52, a pivot arm 53, and a pin 55. The solenoid 50 is nonmovably attached to the housing 26 as shown in FIG. 3. The piston 52 is operatively coupled to the solenoid 50 such that that the piston 52 can move in the directions of arrows 90 and 91. The pivot arm 53 is movably secured to the housing 26. In particular, the pivot arm is secured to the housing 26 by the pin 55 such that the pivot arm 53 is free to move in the direction of arrows 48 and 49. An upper end of the pivot arm 53 is in contact with the upper surface of the spring retainer 63. Therefore, as the spring bias of the spring 64 urges the spring retainer in the general direction of arrow 99, the pivot arm 53 is rotated about the pin 55 in the general direction of arrow 49. As the pivot arm 53 rotates in the general direction of arrow 49, the lower end of the pivot arm 53 contacts the piston 52. It should be appreciated that the second valve assembly is positioned directly behind the first valve assembly shown in FIG. 3. The second valve assembly further includes a second spring (not shown), which biases the same pivot arm 53 in the general direction of arrow 49, in a manner identical to the first spring 64.

Upon receiving a control signal from an engine control module (not shown) the piston 52 is advanced in the general direction of arrow 90. As the force of the piston 52 overcomes the spring biases of the spring 64 and the second spring, the pivot arm 53 is urged in the general direction of the arrow 48. As the pivot arm 53 moves in the general direction of arrow 48, the upper end of the pivot arm 53 urges the spring retainer 63 in the general direction of arrow 100 thereby advancing the valve member 62 in the general direction of arrow 100.

Figure 4B:
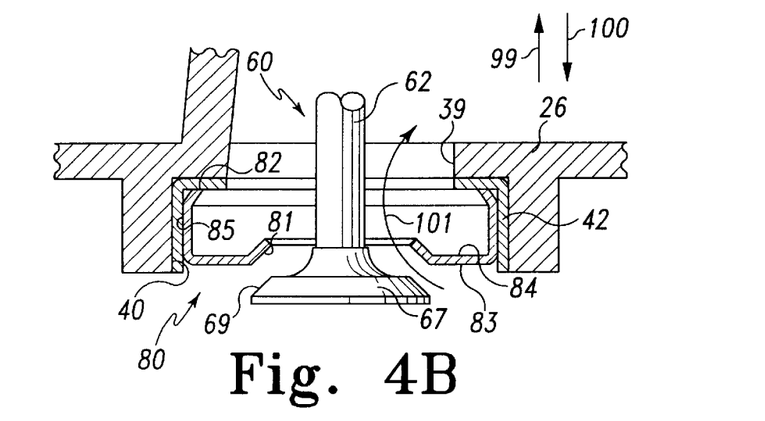
FIG. 4B is a view similar to FIG. 4A but showing the master valve in a second master position.
Figures 5A, 5B:
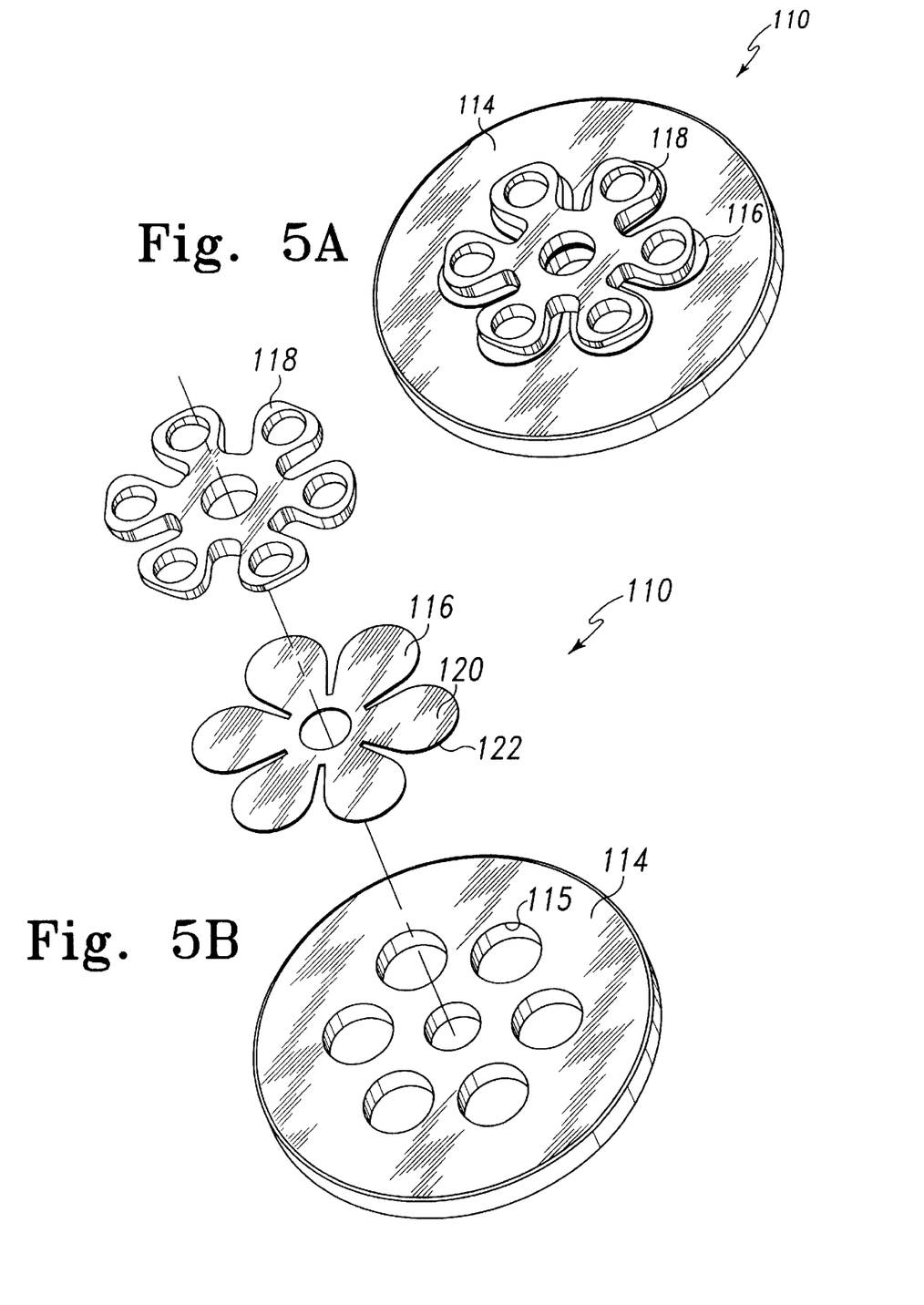
FIG. 5A is a perspective view of the second embodiment of the check valve of the EGR assembly 13 of the internal combustion engine 10 of FIG. 1.
FIG. 5B is an exploded perspective view of the second embodiment of the check valve of FIG. 5A.

It should be appreciated that as the valve member 62 is advanced in the general direction of arrow 100, the master valve 67 is moved out of the first master position and into a second master position. FIG. 4B shows the master valve 67 positioned in the second master position. It should further be appreciated that when the master valve 67 is positioned in the second master position, the check valve 80 is free to move in the directions of arrows 99 and 100. In particular, when the force of fluid pressure at the first inlet 28 acting on a surface 83 of the check valve 80 is greater than the force of fluid pressure at the first outlet 32 acting on a surface 84 of the check valve 80, the check valve 80 moves in the direction of arrow 99 to the first check position as shown in FIG. 5B. As the check valve 80 is moved in the general direction of arrow 99, exhaust gases advance from the first inlet 28 to the first outlet 32. Conversely, when the force of fluid pressure at the first inlet 28 acting on a surface 83 of the check valve 80 is less than the force of fluid pressure at the first outlet 32 acting on a surface 84 of the check valve 80, the check valve 80 moves in the direction of arrow 100 to a second check position as shown in FIG. 5C. As the check valve 80 is moved in the general direction of arrow 100, the seating surface 81 of the check valve seats against the surface 69 of the master valve 67 and the sealing surface 85 contacts the check seal 42. Hence, the check valve 80 isolates the first inlet 28 from the first outlet 32.

Upon receiving a subsequent control signal from an engine control module the piston 52 retracts in the general direction of arrow 91. As the piston 52 moves in the general direction of arrow 91, the force of the piston 52 is removed from the lower surface of the pivot arm 53 thereby allowing the spring biases of the spring 64 and the second spring to rotate the pivot arm 53 in the general direction of arrow 49. As the pivot arm 53 rotates in the general direction of arrow 49, the spring bias of the spring 64 urges the spring retainer 63, and thus the valve member 62, in the general direction of arrow 99 thereby returning the master valve 67 to the first master position and the check valve 80 to a first check position as shown in FIG. 4A.

Figure 6:
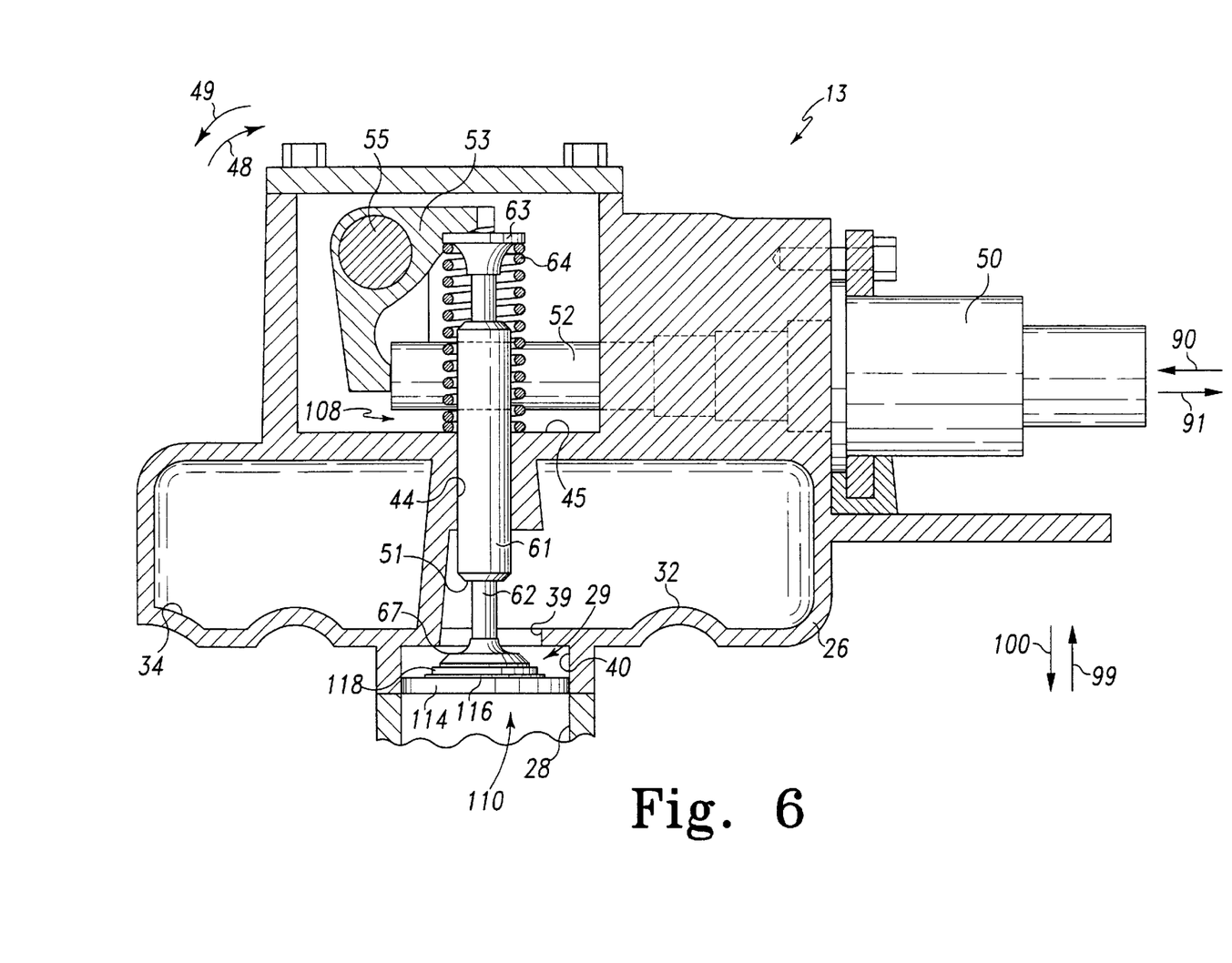
FIG. 6 is a view similar to FIG. 3 but showing the second embodiment of the check valve.
Figure 7A:
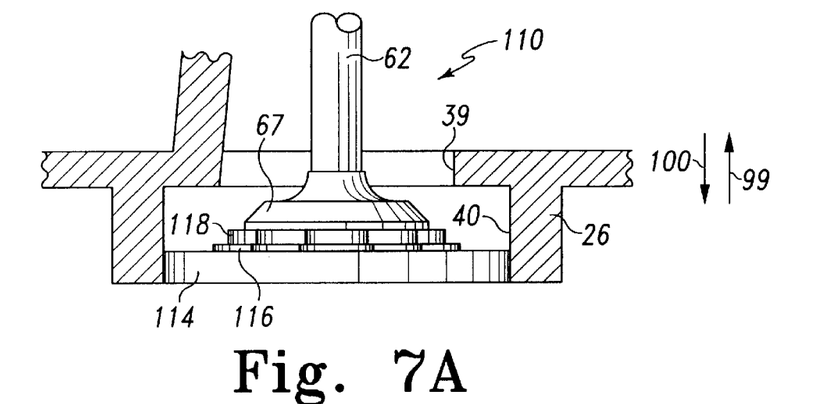
FIG. 7A is a side elevational view of the master valve in the first master position and the second embodiment of the check valve in the first check position.
Figure 7B:
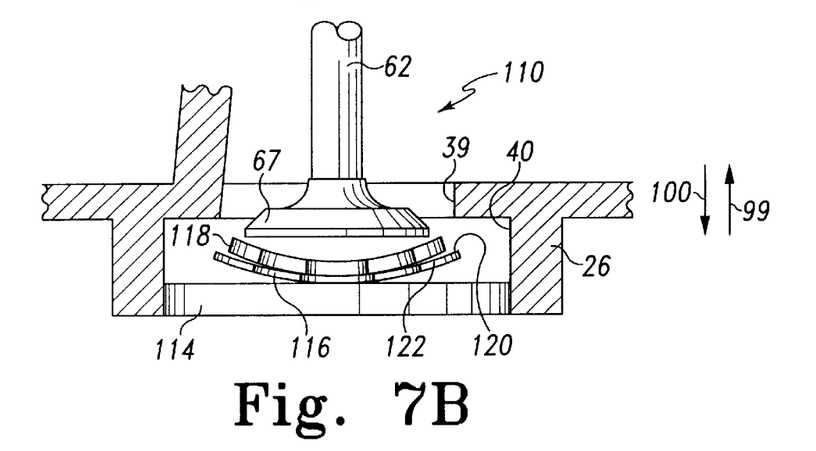
FIG. 7B is a view similar to FIG. 7A but showing the master valve in the second master position and the second embodiment of the check valve in the second check position.
Figure 7C:
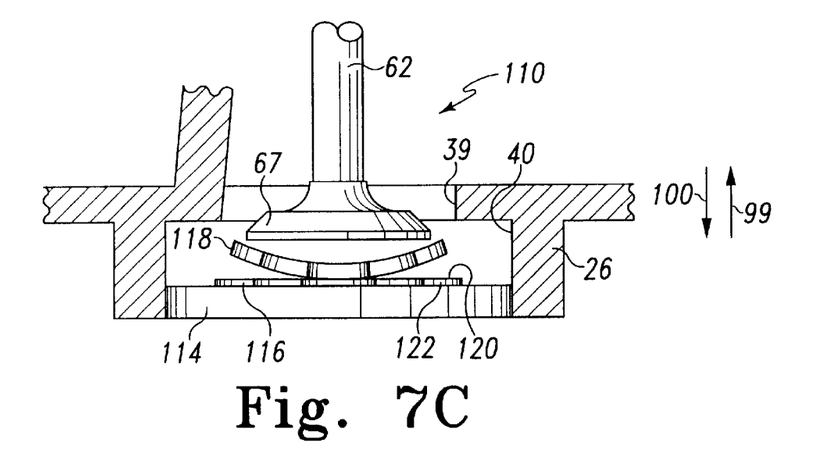
FIG. 7C is a view similar to FIG. 7B but showing the second embodiment of the check valve in the first check position.

Referring now to FIGS. 5–7, there is shown a valve assembly 108 which is a second embodiment of the present invention. The valve assembly 108 includes a check valve assembly 110. The check valve assembly 110 is somewhat similar to the check valve 80 of the valve assembly 60. Thus, the same reference numerals are used in FIGS. 5–7 to designate common components which were previously discussed in regard to FIGS. 1–4. It should be noted that the valve assemblies 60, 108 are substantially identical except for the configuration of the check valve assemblies 80, 110. Therefore, only the check valve assembly 110 will be discussed.

The check valve assembly 110 includes a valve body 114, a check valve 116, and a valve stop 118. The valve body 114 is nonmovably secured within the check recess 40 of the housing 26 by being press fit therein. The valve body 114 has a number of flow openings 115 defined therethrough. The openings 115 place the first housing inlet 28 in fluid communication with the first housing outlet 32 when the valve body 114 is positioned in the check recess 40 as shown in FIGS. 7A–7C.

The check valve 116 is a thin flexible metallic shleet that is positioned on the upper surface of the valve body 114. The valve stop 118 is a semi-rigid member positioned atop the check valve 116. Both the check valve 116 and the valve stop 118 are secured to the valve body 114 by a fastener (not shown).

As the solenoid 50 is deactuated, the piston 52 is positioned as shown in FIG. 6. In this position, the piston 52 is in contact with the lower end of the pivot arm 53. The piston 52 causes the pivot arm 53 to rotate in the general direction of arrow 48 so as to urge the spring retainer 63 and the valve member 62 in the general direction of arrow 100. As the valve member 62 is urged in the general direction of arrow 100, the master valve 67 is also urged in the general direction of arrow 100. As the master valve 67 is urged in the general direction of arrow 100 the master valve 67 comes into contact with the semi-rigid valve stop 118. In particular, the master valve 67 flattens the valve stop 118 into the valve body 114 as shown in FIG. 7A. This places the master valve 67 in a first master position. It should be appreciated that as the master valve 67 is positioned in the first master position, the check valve 116 is held against the surface of the valve body 114 by the valve stop 118 placing the check valve 116 in a first check position. FIGS. 6 and 7A show the master valve 67 positioned in the first master position and the check valve 110 positioned in a first check position.

It should further be appreciated that as the check valve 114 is held against the valve body 114, the check valve 116 covers the openings 115 thereby isolating the first inlet 28 from the first outlet 32. Note that it is desirable isolate the first inlet 28 from the first outlet 32 to prevent the exhaust gasses from being advanced from the exhaust manifold 15 to the intake manifold 17 until the engine control module determines that advancing exhaust gases from the exhaust manifold 15 to the intake manifold 17 is advantageous. Hence, in the second embodiment, the solenoid 50, when deactuated, holds the piston 52 against the lower end of the pivot arm 53. The pivot arm 53 acting on the valve member 62 holds the master valve 67 in the first master position so as to isolate the first inlet 28 from the first outlet 32 until an appropriate control signal is sent from the engine control module.

Upon receiving the appropriate signal from the engine control module, the solenoid 50 retracts the piston 52 in the general direction of arrow 91. Thereafter, the spring bias of the spring 64 and the second spring urges the pivot arm 53 to rotate in the general direction of arrow 49. As the pivot arm 53 rotates in the general direction of arrow 49, the spring 64 urges the spring retainer 63 and the valve member 62 in the general direction of arrow 99. As the valve member 62 moves in the general direction of arrow 99, the master valve 67 is moved in the general direction of arrow 99 to place the master valve in a second master position as shown in FIG. 7B. When the master valve 67 is positioned in the second master position, the check valve 116 is movable between a first check position and a second check position. In particular, the check valve 116 can be moved into and out of contact with the valve body 114. Specifically, when the force of the pressure at the first inlet 28 acting upon a bottom surface 122 of the check valve 122 is greater in magnitude than the force of the pressure at the first outlet 32 acting on a top surface 120 of the check valve 116, then the check valve 116 is deflected in the general direction of arrow 99. When the check valve 116 is deflected in the general direction of arrow 99, the check valve 116 no longer covers the flow openings 115 and the check valve 116 is placed in a second check position as shown in FIGS. 7B and 7C. Thus, the first inlet 28 may be placed in fluid communication with the first outlet 32 when the check valve 116 is located in the second check position. It should be appreciated that the deflection of the check valve 116 in the general direction of arrow 99 is limited by contact with the valve stop 118 as shown in FIG. 7B. Conversely, when the force of the pressure at the first outlet 32 acting upon the surface 120 is greater in magnitude than the force of the pressure at the first inlet 28 acting on surface 122, then the check valve 116 is deflected in the general direction of arrow 100. When the check valve 116 is deflected in the general direction of arrow 100, the check valve 116 is held over the openings 115 and the check valve 116 is placed in a first check position as shown in FIG. 7C. Thus, the first inlet 28 is isolated from fluid communication with the first outlet 32 when the check valve 116 is located in the first check position.

Industrial Applicability

In operation, the EGR valve assembly 13 of the first embodiment of the present invention places the master valve 60 in a first master position and check valve 80 in a first check postion thereby isolating the first inlet 28 from the first outlet 32 and isolating the second inlet (not shown) from the second outlet 34. During such operation, advancement of exhaust gases from the exhaust manifolds 15, 16 to the intake manifold 17 is inhibited.

However, it is desirable to prevent the formation of $NO_x$ under certain engine operating conditions. Hence, during such operating conditions, an engine control module (not shown) associated with the internal combustion engine 10 generates a control signal which is sent to the solenoid 50 thereby causing the piston 52 to advance in the general direction of arrow 90. As the piston 52 is advanced in the general direction of arrow 90, the master valve 60 moved from the first master position as shown in FIG. 5A to the second master position as shown in FIG. 5B.

Figure 4C:
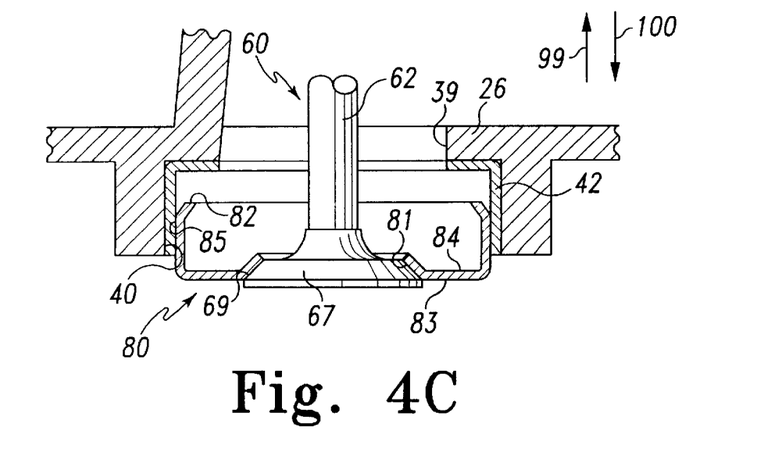
FIG. 4C is a view similar to FIG. 4B but showing the check valve in a second check position.

Like a conventional EGR valve, when the pressure of the exhaust gases in the exhaust manifold 15 is always greater than or equal to the pressure of air in the intake manifold 17, exhaust gases may be advanced from the exhaust manifold 15 to the intake manifold 17. However, unlike a conventional EGR valve, the present invention can operate when the average pressure in the exhaust manifold is less than the average pressure in the intake manifold 17. During theses conditions, when a pressure pulse is created by opening the exhaust valve assembly 24, the instantaneous pressure in the exhaust manifold 15 exceeds the instantaneous pressure in the intake manifold 17. Thus, the pressure pulse urges the check valve 80 into the first check position thereby allowing exhaust gases to be advanced from the exhaust manifold 15 to the intake manifold 17 via a fluid path that includes the line 74, the first inlet 28, the first outlet 32 and the port 76. After the pressure pulse has passed, the instantaneous pressure at the first inlet 28 is less than the instantaneous pressure at the first outlet 32. Thus, the difference in fluid pressure urges the check valve 80 into the second check position as shown in FIG. 4C thereby isolating the exhaust manifold 15 from the intake manifold 17. Isolating the exhaust manifold 15 from the intake manifold 17 prevents the flow of intake air into the exhaust manifold 15 when the instantaneous pressure of air in the intake manifold 17 is greater than the instantaneous pressure of exhaust gases in the exhaust manifold 15.

At a predetermined time, the engine control module ceases to send the control signal to the solenoid 50 thereby deactuating the solenoid 50. Such deactuation allows the spring 64 and the second spring (not shown) to return the cylinder 52 to its original position. In addition, the spring bias of the spring 64 returns the master valve 67 to the first master position as shown in FIG. 4A. As the master valve returns to the first master position, the master valve 67 urges the check valve 80 into the first check position thereby isolating the first inlet 28 from the first outlet 32. It should be appreciated that both the master valve 67 and the check valve 80 will remain in their respective first positions until a subsequent control signal is sent by the engine control module.

In the second embodiment of the present invention, the valve assembly 108 operates in a somewhat similar manner to the valve assembly 60. When it is desired to advance exhaust gases from the exhaust manifold 15 to the intake manifold 17, an engine control module (not shown) associated with the internal combustion engine 10 generates a control signal which is sent to the solenoid 50 thereby causing the piston 52 to retract in the general direction of arrow 91. As the piston 52 is retracted in the general direction of arrow 91, the master valve 67 is moved from the first master position to the second master position.

Again, like a conventional EGR valve, when the pressure of the exhaust gases in the exhaust manifold 15 is always greater than or equal to the pressure of air in intake manifold 17, the check valve 116 may be deflected in the general direction of arrow 99 thereby allowing exhaust gases from the exhaust manifold 15 to advance to the intake manifold 17. However, like the EGR valve assembly 60 of the first embodiment, the EGR valve assembly 108 of the second embodiment can be operated when the average pressure in the exhaust manifold 15 is less than the average pressure in the intake manifold 17. During these conditions, when a pressure pulse is created by opening the exhaust valve assembly 24, the instantaneous pressure in the exhaust manifold 15 exceeds the instantaneous pressure in the intake manifold 17. Thus, if the master valve 67 is positioned in the second master position, the check valve 116 is caused to deflect in the general direction of arrow 99 thereby placing the check valve 116 in the second check position as shown in FIG. 7B so as to allow exhaust gases to advance from the exhaust manifold 15 to the intake manifold 17. After the pressure pulse has passed, the instantaneous pressure at the first inlet 28 drops to less than the instantaneous pressure at the first outlet 32. Thus, if the master valve 67 is still positioned in the second master position, the check valve 116 of the check valve assembly 110 is caused to deflect in the general direction of arrow 100 thereby placing the check valve 116 in the first check position so as to isolate the exhaust manifold 15 from the intake manifold 17 as shown in FIG. 7C.

At an appropriate time, the engine control module (not shown) ceases to send the control signal thereby deactuating the solenoid 50. Thereafter, the solenoid 50 advances in the general direction of arrow 90 causing the master valve 67 to move in the general direction of arrow 100, so as to return the master valve 67 to first master position as shown in FIG. 7A. The master valve 67 then urges the valve stop 118 and the check valve 116 in the general direction of arrow 100 thereby returning the check valve 110 to the first check position as shown in FIG. 7A. Positioning the check valve 110 in the first check position isolates the first inlet 28 from the first outlet 32. It should be appreciated that both the master valve 67 and the check valve 110 will remain in their respective first positions until a subsequent control signal is sent by the engine control module.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

For example, although the internal combustion engine 10 is herein described as being configured with two separate exhaust manifolds 15, 16, and has significant advantages thereby in the present invention, a single or unified exhaust manifold could replace the manifolds 15, 16. In such a configuration, a single or unified line would replace the lines 74 and 75. The unified line would couple the unified exhaust manifold to the first inlet 28 of the housing 26 thereby allowing the valve assembly 13 to be used in an internal combustion engine 10 configured with a unified exhaust manifold.

What is claimed is:

1. A valve assembly, comprising:
    a housing defining a chamber, said housing further defining a housing outlet and a housing inlet both being in fluid communication with said chamber;
    a master valve positioned within said chamber, said master valve being (i) positionable between a first master position and a second master position and (ii) movable relative to said housing inlet such that moving said master valve toward said housing inlet locates said master valve in said second master position; and
    a check valve which is (1) movable between a first check position and a second check position when said master valve is positioned in said second master position, and (2) maintained in said first check position when said master valve is positioned in said first master position.

2. The valve assembly of claim 1, wherein:
    said housing inlet is isolated from fluid communication with said housing outlet when said master valve is positioned in said first master position.

3. The valve assembly of claim 2, further comprising a spring which biases said master valve toward said first master position.

4. The valve assembly of claim 1, wherein:
    said housing inlet is isolated from fluid communication with said housing outlet when (1) said master valve is positioned in said second master position, and (2) pressure at said housing outlet is greater than pressure at said housing inlet.

5. The valve assembly of claim 1, wherein:
    said housing inlet is in fluid communication with said housing outlet when (1) said master valve is positioned in said second master position, and (2) pressure at said housing outlet is less than pressure at said housing inlet.

6. The valve assembly of claim 1, wherein:
    said chamber includes a check recess, and
    said check valve is positioned within said check recess.

7. The valve assembly of claim 6, further comprising a check seal which is (1) positioned within said check recess, and (2) interposed between said housing and said check valve.

8. The assembly of claim 6, wherein when said master valve is positioned in said first master position:
    said master valve is seated against said check valve, and
    said check valve is urged toward said housing.

9. The assembly of claim 6, wherein said master valve is seated against said check valve so as to urge said check valve toward said housing when said master valve is positioned in said first master position.

10. The valve assembly of claim 9, further comprising a check seal, wherein:
    said check seal is positioned (1) in contact with said housing, and (2) within said check recess, and
    said check valve is seated against said check seal when master valve is positioned in said first master position.

11. The valve assembly of claim 1, wherein said check valve comprises:
    a valve body having an opening defined therein, and
    a valve member which is positionable between a first valve member position and a second valve member position, wherein (1) said valve member prevents fluid flow through said opening when said valve member is positioned at said first valve member position, and (2) said valve member allows fluid flow through said opening when said valve member is positioned at said second valve member position.

12. The valve assembly of claim 11, wherein said valve member is made of a thin flexible metallic sheet.

13. The valve assembly of claim 11, wherein said check valve further comprises:
    a valve stop positioned in relation to said valve member so as to limit a range of movement of said valve member.

14. The valve assembly of claim 13, wherein when said master valve is moved from said second master position to said first master position:
    said master valve is urged into contact with said valve stop,
    said valve stop is urged into contact with said valve member, and
    said valve member is urged into said first valve member position.

15. An engine assembly, comprising:
    an internal combustion engine having an engine air inlet and an engine exhaust outlet;
    a master valve assembly which includes (i) a valve housing having a housing inlet and a housing outlet and (ii) a master valve positioned within said valve housing;
    a first conduit which connects said engine exhaust outlet in fluid communication with said housing inlet;
    a second conduit which connects said engine air inlet in fluid communication with said housing outlet, wherein said master valve assembly (1) places said first conduit in fluid communication with said second conduit in a first mode of operation, and (2) isolates said first conduit from said second conduit in a second mode of operation; and
    a check valve assembly which prevents fluid flow between said engine air inlet and said engine exhaust outlet via said first conduit and said second conduit when (1) pressure at said engine air inlet is greater than pressure at said engine exhaust outlet, and (2) said master valve assembly is in said first mode of operation,
    wherein said master valve is interposed between said check valve and said housing inlet.

16. The engine assembly of claim 15, wherein:
    said valve housing defines a chamber,
    said housing outlet and said housing inlet are both in fluid communication with said chamber,
    said master valve is positioned within said chamber,
    said master valve is positionable between a first master position and a second master position, and
    said check valve assembly includes a check valve which is (1) movable between a first check position and a second check position when said master valve is positioned in said second master position, and (2) maintained in said first check position when said master valve is positioned in said first master position.

17. The engine assembly of claim 16, wherein:
    said chamber includes a check recess,
    said check valve is positioned within said check recess,
    said check valve assembly further includes a check seal which is (1) positioned within said check recess, and (2) interposed between said valve housing and said check valve, and when said master valve is positioned in said first master position (1) said master valve is seated against said check valve, and (2) said check valve is urged toward said housing.

18. The engine assembly of claim 15, wherein said check valve assembly includes:

a valve body having an opening defined therein, a valve member which is positionable between a first valve member position and a second valve member position, wherein (1) said valve member prevents fluid flow through said opening when said valve member is positioned at said first valve member position, and (2) said valve member allows fluid flow through said opening when said valve member is positioned at said second valve member position, and a valve stop positioned in relation to said valve member so as to limit a range of movement of said valve member.

19. A method of controlling a flow of engine exhaust in an engine assembly which includes (1) an internal combustion engine having an engine air inlet and an engine exhaust outlet, (2) a master valve assembly which includes (i) a valve housing having a housing inlet, and a housing outlet and (ii) a master valve positioned within a chamber of the housing and being movable relative to the housing inlet, (3) a first conduit which connects the engine exhaust outlet in fluid communication with the housing inlet, and (4) a second conduit which connects the engine air inlet in fluid communication with the housing outlet, comprising the steps of:

moving said master valve toward said housing inlet so as to place the master valve assembly in a first mode of operation thereby placing the first conduit in fluid communication with the second conduit;

operating the master valve assembly in a second mode of operation so as to isolate the first conduit from fluid communication with the second conduit; and preventing fluid flow between the engine air inlet and the engine exhaust outlet via the first conduit and the second conduit when (1) pressure at the engine air inlet is greater than pressure at the engine exhaust outlet, and (2) the master valve assembly is in the first mode of operation.

20. The method of claim 19, wherein:

the engine assembly further includes a check valve assembly, and the preventing step includes the step of operating a check valve assembly so as to prevent fluid flow between the engine air inlet and the engine exhaust outlet via the first conduit and the second conduit when (1) pressure at the engine air inlet is greater than pressure at the engine exhaust outlet, and (2) the master valve assembly is in the first mode of operation.

* * * * *